US005132940A

United States Patent [19]

Culbert

[11] Patent Number: 5,132,940

[45] Date of Patent: Jul. 21, 1992

[54] CURRENT SOURCE PREAMPLIFIER FOR HYDROPHONE BEAMFORMING

[75] Inventor: James A. Culbert, Hingham, Mass.

[73] Assignee: Hazeltine Corp., Greenlawn, N.Y.

[21] Appl. No.: 715,352

[22] Filed: Jun. 14, 1991

[51] Int. Cl.[5] .............. H04B 1/06

[52] U.S. Cl. .............. 367/135

[58] Field of Search .............. 367/135, 103; 330/98, 330/102, 103

[56] References Cited

PUBLICATIONS

Urick, Principles of Underwater Sound, 1983, p. 32.

*Primary Examiner*—Daniel T. Pihulic

*Attorney, Agent, or Firm*—E. A. Onders

[57] ABSTRACT

A preamplifier for beamforming hydrophone signals of a sonar array. The invention uses an amplifier that provides a current-source type of output for driving the beamforming network, thus avoiding the substantial signal loss inherent in using voltage-source amplification. To obtain the stability of gain required in this type of operation, the invention employs a negative feedback system that can be easily adjusted by choice of resistors to accommodate desired levels of shading and signal equalization. The advantages provided are savings in cost, reduction in size and power requirements and improved in signal-to-noise ratio.

14 Claims, 2 Drawing Sheets

CURRENT SOURCE PREAMPLIFIER FOR HYDROPHONE BEAMFORMING

BACKGROUND OF THE INVENTION

1. Field of the Invention

This invention relates to sound and navigation ranging (sonar) arrays employing a solid state preamplifier apparatus which provides improved signal to noise ratio performance, and reductions in cost, required space and power consumption.

2. Description of the Related Art

As is well known by those skilled in sonar technology, hydrophones are normally used in arrays in which a number of spaced elements are employed. Such arrays have several advantages over a single hydrophone, namely, greater sensitivity, directional properties, and better signal-to-noise ratio. (Robert J. Urick, *Principles of Underwater Sound*, (3rd ed.; New York, McGraw Hill Book Company, 1983), p. 32. Typically, each hydrophone in any array is followed by a separate preamplifier channel in which amplification and shading functions are performed. These shading functions, used to determine the shape of the sonar beam pattern, are well understood by those skilled in the art. The outputs of the preamplifier channels of the array are combined in beamforming apparatus to form one or more sonar beams. Since sonar arrays may consist of anywhere from two to a large number of hydrophones, economy of space, cost, and power usage are important factors in the design process. Because of the low power output of hydrophones, preamplifier voltage gains of the order of 40 dB have been used. However, the manner in which prior-art preamplifiers have been coupled to the analog beamforming apparatus has resulted in significant attenuation of the signal at the beamformer. Specifically, most preamplifiers have voltage-source outputs, whereas the beamforming apparatus has required current-source drive. To effect conversion of the preamplifier voltage source to a current source, a resistor whose resistance was high in comparison to the beamformer input impedance was used to couple each preamplifier output to the beamformer, a technique well-known to circuit designers. While effective for the described conversion, the technique results in significant undesired attenuation of the signals at the beamformer's inputs.

Two disadvantages result from the aforementioned undesired attenuation. First, subsequent amplification after the beamformer has been required to compensate for the attenuation. Second, the attenuated signals at the beamform have been at such a low level that pickup of even low levels of undesired electromagnetic interference (EMI) on the beamformer and its connecting leads has been sufficient to degrade the signal-to-noise (S/N) ratio. Shielding and other measures to reduce the EMI result in increased cost.

Simplified preamplifiers which have current-source outputs, with feedback stabilized gain, which therefore may be coupled directly to the beamforming apparatus without causing the aforementioned attenuation is not found in prior-art apparatus.

SUMMARY OF THE INVENTION

It is an object of the invention to provide a current source preamplifier that eliminates the need for buffer amplifiers to couple the beamformer and on-axis summer outputs.

It is a further object of the invention to provide a current source preamplifier that improves signal to noise ratio performance.

It is still another object of the invention to provide a current source preamplifier that reduces the number of parts, cost, space and power consumption as compared to prior art devices.

Finally, it is an objection of the invention is to provide a current source preamplifier that, through proportioning of parameters of the invention and summing apparatus, makes it possible:

1. shading the signal produced by the hydrophone array;

2. equalization of the beamformer and on-axis summers, and the outputs of the beamformer and on-axis summers, and 3. equalization of the output impedances of said beamforming and on-axis summing apparatus so as to properly match the input-impedance requirements of multiplexing apparatus to which the beamformer and on-axis summer outputs are coupled.

The invention is a current-source preamplifier for amplifying a hydrophone output signal. First amplification means for amplifying the hydrophone output signal is provided. Said first means has inverting and non-inverting input ports for receiving the output signal of said hydrophones. Also, said first means has an output port for providing an amplified signal corresponding to the input signal provided at the non-inverting input port which is a voltage source output. Second amplification means for amplifying the output signal provided by said first means is provided. Said second means has an input for receiving the output signal from said first means and said second means has a plurality of output ports. At least one of said output ports provides an amplified current-source type of output corresponding to the input received from said first means. Feedback means for stabilizing the output gain of said preamplifier from fluctuations in output gain resulting from temperature changes and component variations of said preamplifier is provided, wherein said feedback means resistively couples an output port of said second means to an input port of said first means.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
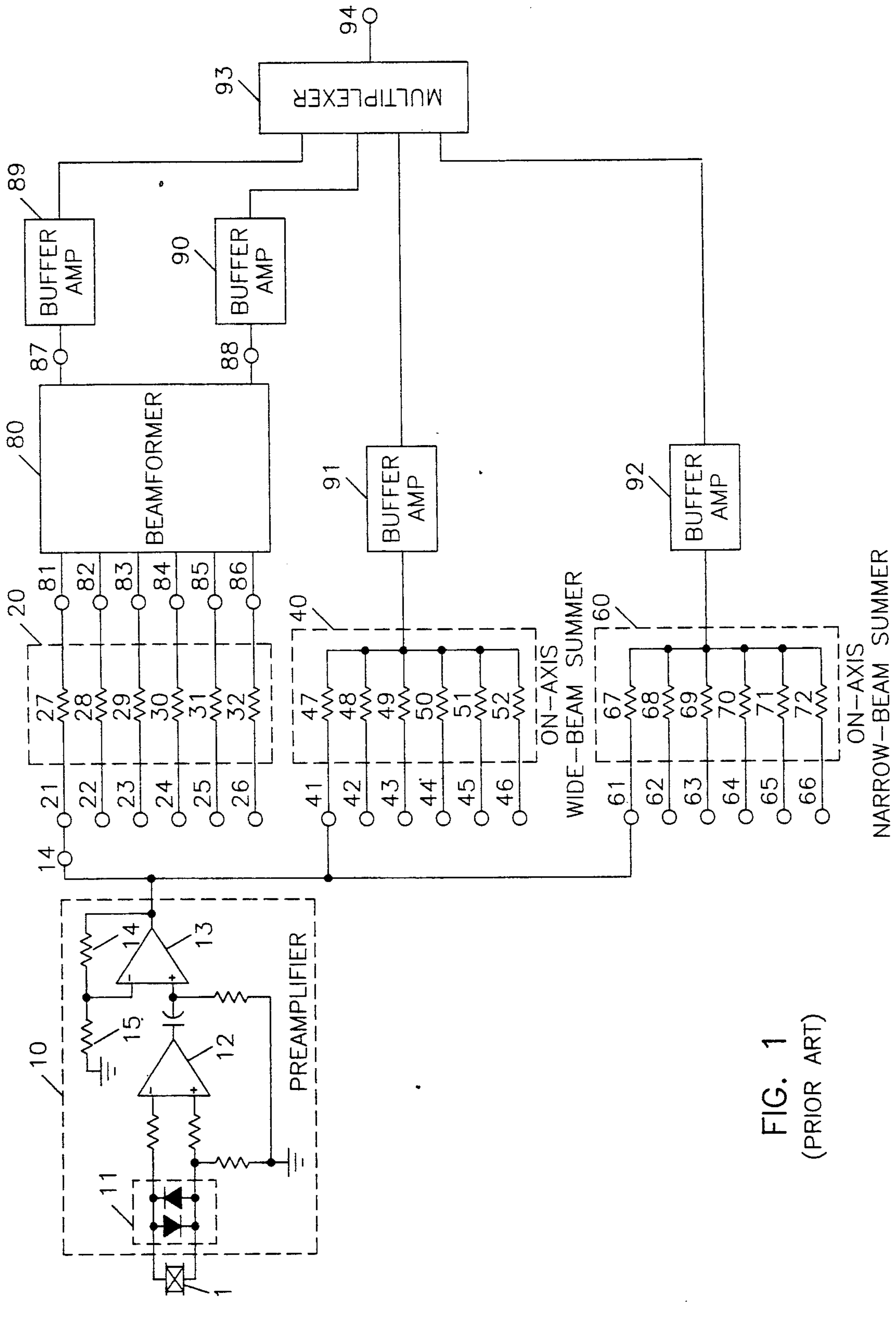
FIG. 1 (PRIOR ART)
FIG. 1 is a circuit diagram, partially schematic and partly in block form, of a portion of prior-art sonar array apparatus.

In the following discussion, the term beamformer, or beamformer apparatus, will refer to apparatus which forms a beam at some angle other than the normal to the plane of the hydrophone array, or, in a line array, to the line on which the hydrophones lie. The beamformer may form beams that are at both positive and negative angles with respect to the said normal.

Additionally, the preamplifier outputs may also be coupled to summing apparatus to form one or more on-axis beams, i.e., beams whose directions are along the normal to the plane, or line, of the hydrophone array. (Two on-axis beams are commonly formed, one wide and one narrow).

In sonar system design the usual practice is to improve system performance through the use of several hydrophones arranged in an array which may consist of the several hydrophones spaced along a straight line. As is well known to those skilled in the art, the summed output of all the hydrophones provides directivity in the reception of a desired signal of periodic nature. Maximum amplitude of the received signal, i.e., maximum sensitivity, occurs when the signal source lies somewhere along the array axis, i.e., a line normal to the center of the line through the array hydrophones. Further, the summed output from the array has better signal-to-noise (S/N) ratio than the output from one hydrophone alone, if the noise is stochastic in nature, being uncorrelated and coming equally from all directions to all hydrophones.

Normally the distance between adjacent hydrophones in a line array is one-half the wavelength of the received signal. As is known to those skilled in the art, as the signal source moves off to either side of the hydrophone-array axis, the signal thereby comes to the array at some angle to the axis, the periodic nature of the signal will cause the sum of the hydrophone outputs to maximize at more than one angle of reception. Thus, the reception pattern of the array is essentially a beam pattern in which the center of the main lobe lies along the hydrophone-array axis, and side lobes are positioned at specific angles either side of the main lobe. The magnitude of these side lobes relative to the main desired lobe are reduced by reducing the amplitudes of the electrical signals from the hydrophones toward the ends of the array (relative to the amplitudes of the electrical signals from the hydrophones at or near the center of the array) prior to summing the signals. This technique is known by the term shading, and reduces the amplitude of the side lobes that are generated when hydrophones are summed.

As is well known to those skilled in the art, the main lobe of the beam pattern of a sonar array can be steered to a specific angle relative to the array axis by incorporating predetermined time delays or phase shifts, in the paths of the electrical signals detected by the hydrophones in an array. Typically there is no delay or phase shift applied in the path of the hydrophone at one end of the steered array, but delay or phase shift is added in each hydrophone signal path, successively increasing by some predetermined increment proceeding down the array. A common procedure, using time delay, is to couple the preamplified signals from successive hydrophones along the array to corresponding successive taps along a delay line, each tap separates the signal from adjacent taps by some predetermined incremental time delay. This is the technique employed in the embodiments described herein, but the features of the invention are also applicable in apparatus employing phase shift, rather than time delay.

In sonar apparatus where sufficient power and space are available digital signal processing techniques are normally used to perform the beamforming and shading functions. However, where space and power are at a premium, and where few beams are needed, it is advantageous to use analog techniques. The apparatus covered by the present invention falls in the latter category. The embodiments described use a six-hydrophone array, but the features of the invention are by no means restricted to that number and are equally applicable to both larger and smaller arrays.

To provide a basis for better describing the features of the invention, one form of prior-art apparatus will be described first. FIG. 1 shows the circuit diagram (partially schematic and partially block) of that portion of a six-channel sonar array which is pertinent to the application of the present invention. For the sake of clarity, only one signal channel, hydrophone 1 plus preamplifier 10, is shown. The outputs of the remaining five channels (not shown) would similarly be connected to terminals 22 through 26 of the beamformer input-resistor network 20, terminals 42 through 46 of the on-axis narrow-beam summer 40, and terminals 62 through 66 of the on-axis narrow-beam summer 60.

Signals picked up by hydrophone 1 are coupled to the input of preamplifier 10 where the signal is first limited in low-level limiter 11 which protects the following amplifier apparatus from damage otherwise caused by very high voltage surges which may result from explosive shock, for example. The limiter output is resistively coupled to differential amplifier 12, where, in the embodiment described, the signal is amplified of the order of 20 dB. The output of differential amplifier 12 is coupled to the non-inverting input of operational amplifier (opamp) 13, where the signal is further amplified of the order of 20 dB. As is well known to those skilled in the art, the resistance values of resistors 14 and 15, relative to each other, determine the gain of opamp 13. It will be noted that for simplification of the diagram, required power supply and possible bias connection, which would be well-known to those skilled in the art, have not been shown.

The output of preamplifier 10 appearing at terminal 14 is coupled to input terminal 81 of beamformer 80 through resistor 27 in beamformer input-resistor-network 20. Beamformer 80 contains a tapped delay line, and input terminals 81 through 86 are coupled to connections along the length of the line, as is well known to those skilled in the art.

The output of preamplifier 10 at terminal 14 is a voltage-source type of output at low impedance. By comparison the input impedance to the delay line tap at terminal 81 is relatively high, of the order of 1,500 ohms in the apparatus described. If preamplifier output terminal 14 were connected directly to input terminal 81 of the beamformer, the low preamplifier output impedance would essentially short to ground the delay line tap at terminal 81, and thereby preclude the desired beamforming function. Coupling resistor 27, whose resistance is high in comparison to the delay-line impedance, essentially converts the voltage source at terminal 14 to a current source at terminal 81, thereby permitting beamformer 80 to perform its desired function. However, as will be obvious to those skilled in the art, the signal at terminal 81 is significantly attenuated with respect to the signal at terminal 14. This attenuation has at least two undesired effects. First, amplification following the beamformer must be added to compensate for the attenuation. Second, the signals at the inputs and outputs of beamformer 80 have been reduced to such a low level that EMI pickup on the connecting leads thereto degrades the S/N ratio. To alleviate this problem, shielding and other EMI reduction techniques are required to maintain the integrity of the desired signal. These corrective measures add cost and bulk to the apparatus.

As discussed earlier, five additional hydrophones and their associated preamplifiers (not shown in FIG. 1) are included in the array and are coupled to the appropriate aforementioned input terminals of beamformer input-resistance network 20 and on-axis summers 40 and 60. By methods to be described shortly, the signals from the six channels are shaded to provide electrical signals representative of the desired beam patterns at the output of the apparatus.

Also, by methods known to persons skilled in the art, delay-line apparatus (and connections thereto) in beamformer 80 have been arranged to provide two outputs at terminals 87 and 88, one representing a sonar beam whose major lobe is at a positive angle with respect to the array axis, and one with the major lobe at a negative angle. Buffer amplifiers 89 and 90 amplify these two beamformer output signals sufficiently to at least compensate for the aforementioned attenuation, and the buffer amplifier outputs are then coupled to the input of multiplexer 93.

Returning to the output of preamplifier 10 at terminal 14, the signal at that point, in addition to being coupled to the beamformer as just described, is also coupled to input terminals 41 and 61 of on-axis wide-band summer 40 and on-axis narrow-band summer 60, respectively. In these two summers, the preamplifier outputs of all six array channels are added to produce the desired on-axis beam patterns, using shading techniques to be described shortly.

The on-axis summing functions are not accompanied by the severe attenuation inherent in the coupling to beamformer 80. However, the output impedances of summers 40 and 60 are significantly higher than the output impedances of buffer amplifiers 89 and 90. Moreover, multiplexer 93, in conjunction with a following line-driver amplifier (fed from terminal 94, but not shown in FIG. 1), requires essentially equal impedances of the four driving sources coupled to its inputs. Therefore, buffer amplifiers 91 and 92 are required following summers 40 and 60, respectively, so as, at a minimum, to equalize the output impedances of the four beam sources coupled to the inputs of multiplexer 93, and may be further required by gain adjustment, to equalize the sensitivities of the four beams.

With respect to shading, a combination of measures was employed to obtain the desired beam patterns. First, the gains of all six preamplifiers were not the same. The gains of the preamplifiers in the array, relative to each other, were set to the predetermined values (not all channels the same) by separately proportioning resistors 14 and 15 in each array channel. Further shading adjustments for the outputs of beamformer 80 were made by the use of differing values of predetermined resistance of the coupling resistors in beamformer input-resistance network 20.

Similarly, different values of resistance of the resistors in on-axis wide-band summer 40 were predetermined to partially provide the desired wide-beam pattern, and yet another set of differing predetermined resistance values was used in on-axis narrow-beam summer 60.

The prior-art apparatus that has been described was used in an environment where the desired signal frequency was of the order to 25 kilohertz. The invention was also applied in an embodiment used in that frequency range, but the invention features are not restricted to use at that frequency.

Figure 2:
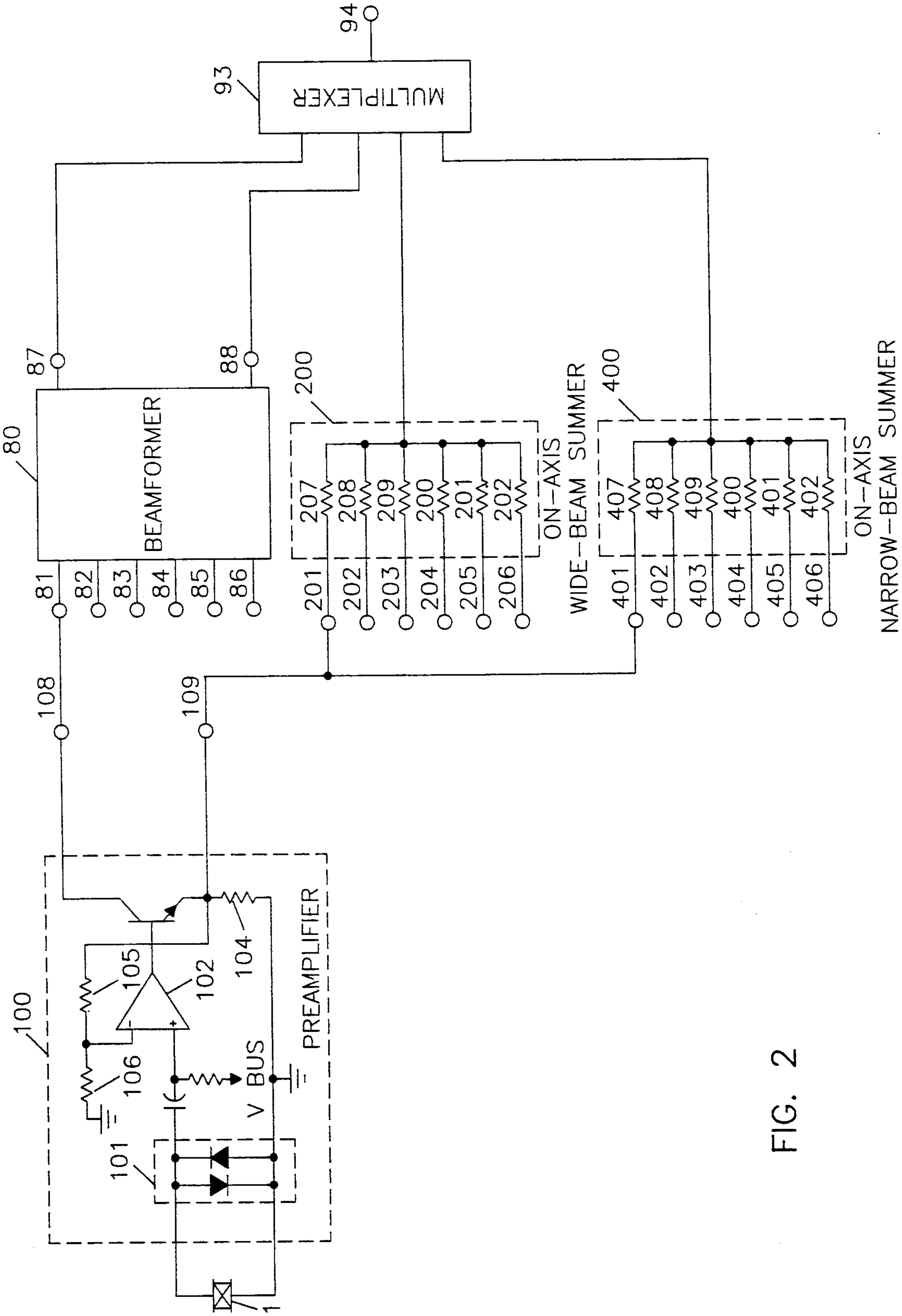
FIG. 2 is a circuit diagram, also partially schematic and partially in block form, of a portion of sonar array apparatus incorporating the present invention.

FIG. 2 shows the circuit diagram, partially schematic and partially block, of a portion of a sonar array in which the invention is embodied (the same portion as shown in FIG. 1). Like the prior-art embodiment of FIG. 1, for simplicity the power supply connections are not show, and only one of the array's hydrophones and its accompanying preamplifier are shown. Connections to the beamformer and summers for a six-channel array are shown, but the invention features and advantages are equally applicable in arrays with more or fewer channels.

In the invention embodiment of FIG. 2, signals picked up by hydrophone 1 are coupled to the input of preamplifier 100. As in the prior-art apparatus, the signal is limited in low-level limiter 101 and is then coupled to the non-inverting input of opamp 102. The opamp output is then coupled to the base of transistor 103. The AC signal voltage across emitter resistor 104 appearing at terminal 109 is very nearly equal to the signal voltage at the base of the transistor, and is essentially of the same phase. The signal at the collector output terminal 108 is of opposite phase with respect to the phase at the transistor base and emitter. Resistors 106 and 105 form a negative feedback loop from the emitter of transistor 103 to the inverting input of opamp 102. The manner in which preamplifier 100, employing the aforementioned feedback loop, uniquely provides for the features of the invention will be described shortly.

In the preferred embodiment of the invention, transistor 103 was a low-cost general purpose bipolar junction transistor (Motorola type 2N4124). However, the features of the invention are not confined to the use of bipolar junction transistors, and may be obtained with other types, such as CMOS or field-effect transistors, for example. The transistor replaces an expensive low-noise opamp having a high grain-bandwidth product which was used in the FIG. 1 prior-art apparatus.

One of the desired features in this invention was to provide a current-source output at terminal 108 of each preamplifier for driving each of the inputs (80 through 86) of beamformer 80, thereby avoiding the substantial signal loss at the beamformer inherent in the prior art apparatus. This objective alone could have been achieved with a preamplifier configured as unit 100 in FIG. 2 but with feedback resistors 105 connected to the base of transistor 103 rather than the emitter, a normal opamp feedback connection. As is known by those skilled in the art, a transistor amplifier with an unbiased emitter resistor will exhibit the characteristic of a current-source at its collector. However, the gain of the transistor in such an arrangement will not meet the stability requirements of a sonar array. There will be unacceptable variations in gain caused by variations in the dc current gain ($h_{FE}$) and base-to-emitter voltage ($V_{BE}$) of the transistor due to both temperature changes and variations from one device to another within normal production tolerance ranges for the transistor device being used.

In sonar arrays, stability of the gains of the preamplifiers is highly important in order to maintain the shading relationships required to preserve the beam-shape integrity, and further to maintain equality (or other required relationship) of the peak sensitivities of the various beams formed in the sonar apparatus. The coupling of the feedback loop from the emitter of transistor 103 through the network of resistors 105 and 106 to the inverting input of opamp 102 not only provides simple, economical, unique, and versatile means for meeting the shading and equality of beam-sensitivity requirements of the array.

In FIG. 2, the preamplifier gain from the non-inverting input of opamp 102 to emitter output terminal 109 of transistor 103 is essentially determined by the proportioning of resistors 105 and 106 in the feedback loop, as is well understood by those skilled in the art. This feedback coupling essentially eliminates the undesired gain changes to emitter terminal 109 that would otherwise occur due to the previously mentioned undesired variations in $V_{BE}$ and $h_{FE}$. It will also be understood by those skilled in the art that the preamplifier gain to emitter terminal 109 is essentially independent of the resistance value of emitter resistor 104. However, the gain to collector output terminal 108 is additionally a function of the resistance value of emitter resistor 104. Thus, to summarize, the preamplifier gain to output terminal 109 is essentially a function of the relative resistance values of feedback network resistors 105 and 106, whereas the gain to output terminal 108 is a function of both the feedback network resistances and the resistance of emitter resistor 104.

Referring to beamformer 80, typically the input signal amplitudes to the six beamformer inputs in the embodiment of FIG. 2, would be shaded. The signal levels at the two ends, terminals 81 and 86, may, for example, be of the order of one-half the level at the center two terminals, 83 and 84, and the signal levels at terminals 82 and 85 may be of the order of 0.7 times the level at the center two terminals. However, these figures are given only as an example for assistance in understanding the operation of the apparatus, and are not critical with respect to the unique features of the invention. In order to provide shading at the beamformer, such as in the example above, the gains to output terminals 108 of the six preamplifiers in the array, relative to each other, may be adjusted in a variety of ways as suggested previously. The relative gains of the six channels may be set to the values required for shading by proportioning the feedback network resistors 105 and 106 separately for each channel, or, by selecting the resistance value of emitter resistor 104 in each channel, or by a combination of both methods. The latter use of combined methods was employed in the embodiment of FIG. 2.

Looking now at the on-axis beam summers 200 and 400, again there is a variety of ways to achieve the on-axis beam shading. First, as has been described, the relative preamplifier gains to emitter output terminals 109 may be set to predetermined values by proportioning of resistors 105 and 106 in the feedback networks, or shading may be achieved through design of the resistor networks in summers 200 and 400. A combination of both methods was used in the preferred embodiment.

In addition to shading requirements, summer networks 200 and 400 are also designed to provide output impedances that are essentially the same as the output impedance of the beamformer. The equalization was required by the multiplexer in conjunction with its following line amplifier (not shown) in the embodiment of FIG. 2. The summer networks do not necessarily need to be in the form shown in blocks 200 and 400 to meet the requirements of the invention apparatus. The essential requirements of the summer networks are that 1) in conjunction with predetermined gains of the six preamplifiers, 100, the networks shall provide the desired shading, 2) each summer's output amplitude at the maximum sensitivity point of its beam shall be essentially equal to the maximum output of beamformer 80 at the maximum sensitivity point of the beam pattern it represents, and 3) the output impedances of the two summers shall be essentially the same as the output impedances of the beamformer. An example of a possible simple variation in networks 200 and 400 falling within the spirit of the invention would be the addition of a resistor to ground at the output of each summer network, if required.

Thus, it is apparent that the invention uniquely provides several methods which may be used separately in some instances, or in combination to provide shading for multiple beams, equalized beam amplitudes and equalized output impedances at the outputs of beamformer 80 and on-axis summers 200 and 400. It will be evident to those skilled in the art that there is a wide choice of combinations of methods for varying gains and combining signals which will provide the features of the invention. A guiding principle in the design of a preferred embodiment of the invention was to use combinations of methods which permitted the use of resistors in the feedback networks, 105 and 106, the emitter resistor 104, and summing networks 200 and 400 which were at or near standard values of resistance.

If the on-axis beams are not required in the sonar apparatus, simplification of the circuit of FIG. 2 may be accomplished while at the same time retaining features of the invention. On-axis summer networks 200 and 400 may simply be deleted, or additionally emitter resistor 104 may be omitted and the emitter of transistor 103 may be grounded. For the latter case, feedback resistor 105 would be reconnected to the collector of the transistor, and output signal from limiter 101 would be coupled to the end of resistor 106 shown as the grounded end in FIG. 2. Necessary bias changes and grounding procedures are known to those skilled in the art. The output of beamformer 80 would also be reversed.

In summary, features provided by the invention include:

1. A preamplifier with current-source output to the beamformer which is not accompanied by the gain loss inherent in prior-art apparatus. In the preferred embodiment the delay-line impedance of beamformer 80 was approximately 1500 ohms, and the collector impedance of transistor 103 was greater than 1 megohm. The gain of preamplifier 100 to terminal 108 was of the order of 40 dB. However, these impedance and gain values are not critical with respect to the advantages of the invention.

2. The use of and the opamp plus a low-cost transistor in preamplifier 10 results in a cost saving compared to prior-art apparatus which used two expensive low-noise high gain bandwidth product opamps, and also results in a reduction in required space and power.

3. Because the preamplifier provides a much higher level of signal to the beamformer than prior-art apparatus, the signal-to-noise ratio is not degraded by EMI pickup at the beamformers, and costly shielding and EMI reduction measures are not required.

4. The buffer amplifiers following the beamformer in prior-art apparatus have been eliminated with substantial savings in cost and a reduction in required space and power.

5. Because the output impedances of summer networks 200 and 400 can be equalized to the output impedance of beamformer 80, buffer amplifiers following the summers are not required as they were in the prior-art apparatus, effecting further savings in cost and a reduction in required space and power.

Although the invention embodiment shown in the diagram of FIG. 2 incorporates one beamformer with two outputs, and two on-axis summers, the invention is not limited to that number of beamforming and summing apparatus.

While there have been described what are at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A current-source preamplifier for amplifying a hydrophone output signal comprising:

first amplification means for amplifying the hydrophone output signal, said first means having inverting and non-inverting input ports for receiving the output signal of said hydrophone and said first means having an output port for providing an amplified signal corresponding to the input signal provided at the non-inverting input port;

second amplification means for amplifying the output signal provided by said first means, said second means having an input for receiving the output signal from said first means and said second means having a plurality of output ports, at least one of said output ports providing an amplified current-source type of output corresponding to the input received from said first means.

2. The current-source preamplifier of claim 1 wherein said second amplification means further comprises:

feedback means for stabilizing the output gain said preamplifier from fluctuations in output gain resulting from temperature changes and component variations of said preamplifier, wherein said feedback means resistively couples an output port of said second means to an input port of said first means.

3. The current-source preamplifier of claim 2 wherein said second means further comprises a transistor in which the base is connected to the output port of said first means and the collector of the transistor provides an amplified output signal to a beamforming network.

4. The current-source preamplifier of claim 3 wherein said feedback means further comprises a resistive path from the emitter of the transistor of said second means connected to the inverting input port of said first means.

5. The current-source preamplifier of claim 2 wherein said second means further comprises an output port connected to at least one on-axis beam summing network.

6. The current-source preamplifier of claim 5 wherein said feedback means further comprises a resistive path from an output port connected to an on-axis beam summing network to a reference direct current potential, said feedback means stabilizing the output signal provided to the on-axis summing network.

7. The current source preamplifier of claim 6 wherein said second means further comprises a transistor in which the base is connected to the output port of said first means, the collector is connected to a beamforming network and the emitter is connected to at least one on-axis summing network.

8. The current-source preamplifier of claim 7 wherein feedback means further comprises a resistive path from the emitter of the transistor of said second means connected to the inverting input port of said first means and a resistive path from the emitter of the transistor of said second means connected to a reference direct current potential.

9. A sonar array network having a plurality of hydrophones comprising:

a plurality of current-source type of output preamplifiers for each of the hydrophones, each preamplifier having at least one output port that provides a feedback stabilized amplified signal corresponding to each hydrophone in said array;

at least one beamforming network, each beamforming network having a plurality of input channels for each preamplifier, each input channel of said beamforming network connected to the feedback stabilized output of said preamplifiers; wherein the output of said beamforming network is representative of a sonar beam pattern;

each said preamplifier further comprising at least one resistor for each output port, independently selectively, corresponding to the output gain of its associated output port;

each said channel of said beamforming network further comprising at least one resistor, independently selectable, corresponding to said channel's signal output; wherein signal outputs from each preamplifier and from each channel of the beamforming network are shaded independently.

10. The sonar array in claim 9 further comprising:

at least one summing network, each summing network having a plurality of input channels for each said preamplifier, each input channel of said summing network connected to a feedback stabilized output port of each said preamplifier, each output port of said preamplifier being separate from the output port that is connected to a channel of said beamforming network;

said summing network further comprising a resistor for each said input channel, independently selectable, corresponding to the output gain of its associated preamplifier wherein signal outputs from each preamplifier and its corresponding on-axis summing network channel are shaded independently from one another and are shaded independently from the shading provided in the beamforming network.

11. The sonar array in claim 10 wherein the preamplifiers, beamforming networks, and on-axis summing networks can be resistively adjusted so that the output impendance of said beamforming networks and said on-axis summing networks are substantially equal.

12. The sonar array in claim 11 wherein the outputs of the beamforming networks and the outputs of the on-axis summing networks are directly connected to a multiplexing network.

13. A method of providing output signals from multi-channel beamforming networks and from multi-channel on-axis summing networks that can be connected directly to the multiplexer network of a sonar array comprising the steps of:

amplifying the input signals to said beamforming networks through current-source amplification;

resistively stabilizing the input signals to said beamforming networks using a negative feedback system that utilizes resistive elements in said beamforming networks;

shading the input signals to said beamforming networks to produce a signal representative of the sonar beam pattern of said array;

amplifying the input signal to said on-axis summing networks;

resistively stabilizing the input signals to said on-axis summing networks incorporating at least part of the negative feedback system used to stabilize the input signals to said beamforming networks and utilizing resistive elements in said on-axis networks;

adjusting through resistance selection the input signals to said beamforming networks and said on-axis networks so that the output impendance of said networks are substantially equal and corresponds to the load of the multiplexer of said sonar array.

14. The method of claim 13 wherein the step of shading further comprises the step of:

selecting proportionate resistance values in each channel of said beamforming networks that corresponds to the amplified input signal to each channel wherein a beam pattern is provided at the output of said beamforming network having a major lobe whose direction is at a predetermined angle with respect to a line representative of the axis of the sonar array.

* * * * *